US008227039B2

(12) United States Patent
Hilken et al.

(10) Patent No.: US 8,227,039 B2
(45) Date of Patent: Jul. 24, 2012

(54) HIGH AMYLOSE STARCH WALLBOARD AND METHOD OF MAKING SAME

(75) Inventors: Matthew M. Hilken, Charlotte, NC (US); David G. Peterson, Jr., Charlotte, NC (US)

(73) Assignee: National Gypsum Properties, LLC, Charlotte, NC (US)

( * ) Notice: Subject to any disclaimer, the term of this patent is extended or adjusted under 35 U.S.C. 154(b) by 1101 days.

(21) Appl. No.: 11/126,914

(22) Filed: May 9, 2005

(65) Prior Publication Data

US 2006/0251914 A1 Nov. 9, 2006

(51) Int. Cl.
*B05D 3/12* (2006.01)
*C04B 11/00* (2006.01)
*D21H 19/54* (2006.01)
*B32B 29/00* (2006.01)

(52) U.S. Cl. ........ 427/326; 106/779; 427/322; 427/324; 428/294.4; 428/294.7; 428/532; 428/536; 428/537.5; 428/537.7

(58) Field of Classification Search .......... 428/532–534, 428/536, 537.5, 537.7, 294.7, 294.4; 427/322, 427/324, 326; 106/779
See application file for complete search history.

(56) References Cited

U.S. PATENT DOCUMENTS

| | | | |
|---|---|---|---|
| 3,459,571 A | 8/1969 | Shannon | |
| 4,009,062 A * | 2/1977 | Long | 156/39 |
| 4,119,752 A | 10/1978 | Long | |
| 4,626,288 A * | 12/1986 | Trzasko et al. | 106/206.1 |
| 6,902,797 B2 * | 6/2005 | Pollock et al. | 428/304.4 |
| 7,048,794 B2 * | 5/2006 | Tagge et al. | 106/804 |
| 2004/0045481 A1 * | 3/2004 | Sethuraman et al. | 106/674 |

* cited by examiner

*Primary Examiner* — D. S. Nakarani
(74) *Attorney, Agent, or Firm* — Ice Miller LLP

(57) ABSTRACT

The subject invention relates to compositions and methods for the preparation of stucco slurry compositions. The compositions and methods involve replacing typically used starches with modified high amylose starches that can be used in the normal wallboard manufacturing process. The compositions and methods provide wallboards having increased core strength and increased paper-to-core bond integrity compared to standard wallboards made from slurries with reduced water levels.

10 Claims, No Drawings

HIGH AMYLOSE STARCH WALLBOARD AND METHOD OF MAKING SAME

BACKGROUND OF THE INVENTION

The subject invention relates generally to the compositions of wallboard, also known as "drywall", and methods of the preparation of wallboard. More particularly, the subject invention is generally directed towards methods of preparation of a wallboard composition that has improved strength characteristics when the amount of water in the wallboard composition is reduced. Additionally, the subject invention relates to the manufacturing process used to produce wallboard compositions with such improved strength characteristics.

Conventional gypsum wallboard has been used for over fifty years in the construction of residential and commercial building interior walls and ceilings. Typically, wallboard consists essentially of a gypsum core sandwiched between and bonded to two sheets of paper and is used as a cost-effective replacement of conventional plaster walls. Walls and ceilings made with gypsum wallboard panels are conventionally constructed by securing, with nails or screws, the wallboard panel to structural members, such as wood or metal studs. To be commercially profitable, wallboard is typically manufactured by continuous high speed processes. Typically, natural gypsum (calcium sulfate dihydrate) predominately makes up the wallboard. Manufactures mine and transport gypsum to a board mill in order to dry it, crush/grind it and calcine it to yield stucco. The reaction for the calcinations process is characterized by the following equation:

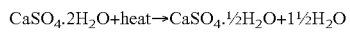

$$CaSO_4 \cdot 2H_2O + heat \rightarrow CaSO_4 \cdot \tfrac{1}{2}H_2O + 1\tfrac{1}{2}H_2O$$

This equation shows that calcium sulfate dihydrate plus heat yields calcium sulfate hemihydrate (stucco) plus water vapor. This process is conducted in a calciner, of which there are several types known in the art.

Calcined gypsum, stucco, has the valuable property of being chemically reactive with water, and will "set" rather quickly when the two are mixed together. This setting reaction reverses the above-described stucco chemical reaction performed during the calcination step. The reaction proceeds according to the following equation:

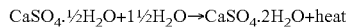

$$CaSO_4 \cdot \tfrac{1}{2}H_2O + 1\tfrac{1}{2}H_2O \rightarrow CaSO_4 \cdot 2H_2O + heat$$

In this reaction, the calcium sulfate hemihydrate is rehydrated to its dihydrate state over a fairly short period of time. The actual time required for this setting reaction generally depends upon the type of calciner employed and the type of gypsum rock that is used. The reaction time can be controlled to a certain extent by the use of additives such as accelerators and retarders.

While conventional gypsum wallboard has many advantages, it has long been desired to reduce the cost of manufacturing such wallboard. One method of reducing the cost of wallboard has been to reduce the amount of water used in the manufacturing of the wallboard. Reduction in water allows for less drying energy which in turn saves the energy costs associated with drying wallboard (i.e., the fuel cost associated with operating a kiln to dry the wallboard). The problem associated with reducing water in the manufacturing process has been keeping the slurry, as explained below in more detail, fluid enough to allow it to be continually deposited on the cover paper. Reducing water negatively impacts the manufacturing process by reducing the slurry fluidity, increasing board weight, adversely affecting the paper-to-core bond, and decreasing the compressive strength of the board. The decrease in wallboard strength and bond quality from reduced water levels has prevented manufacturers from further cutting manufacturing costs by reducing the amount of water used in the slurry composition.

Thus, it would be advantageous to produce a gypsum wallboard composition with improved strength characteristics that allowed for the reduction of the amount of water used in producing the wallboard. Moreover, it would be advantageous to produce a high-strength gypsum wallboard composition that can be combined with known methods of producing lightweight gypsum wallboard in order to impart on such lightweight wallboards strengths similar to, or greater than, heavier wallboard. Such wallboard also should be able to be manufactured through the use of conventional high-speed manufacturing processes without suffering from any negative side effects.

BRIEF INVENTION SUMMARY

An exemplary embodiment of the subject invention is directed to a wallboard core slurry composition comprising calcium sulfate hemihydrate (stucco), water and a high amylose starch having an amylose fraction greater than about 25%. The high amylose starch can comprise a high amylose starch that gels at or below a temperature of approximately 212° F. or in a temperature range of about 160° F. to about 212° F. Examples of high amylose starches that gel at these temperatures include, but are not limited to, Ultra-Set LT, Hylon V, and Hylon VII high amylose starches produced by National Starch Company. Boards made with such starches show an improvement in paper-core bond integrity and compressive strength when water is reduced in the slurry composition as compared to wallboards produced from reduced water slurry compositions with the same addition of traditional acid-thinned starches. It is preferred to make slurries with high amylose starches with water-to-stucco ratio of less than about 0.80 in order to cut manufacturing costs of the wallboard.

Another embodiment of the subject invention is directed to a construction grade wallboard comprising a first sheet of paper, a second cover sheet of paper, and a core positioned in between the first and second sheets of paper, wherein the core comprises calcium sulfate dihydrate and a gelled modified high amylose starch additive that gels at or below a temperature of approximately 212° F., wherein the gelled high amylose starch migrates, during kiln travel, toward the paper-core interface where it retrogrades to a thermoplastic film that bonds the core to each of the first and second sheets of paper. Owing to their high amylose fraction, such starches build very low hot viscosity, and thereby migrate more completely and efficiently than common acid-thinned starches. Likewise such starches, due to their high amylose content, are capable of building much stronger, semi-crystalline films on retrograding at the paper-core interface. Similar to the first embodiment this high amylose starch can also have an amylose fraction greater than about 25% and gel in range of temperatures at about 160° F. to about 212° F. In order for a high amylose starch to gel in this temperature range, it is modified to exhibit this quality during starch manufacture.

Another embodiment is directed toward a method of preparing wallboard, the method comprising the steps of forming a slurry comprising water, calcium sulfate hemihydrate, and high amylose starch; depositing the slurry on a first sheet of paper; applying a second sheet of paper on the slurry to form a wet wallboard; allowing the slurry to set and form a core between the first and second sheets of paper; and causing the high amylose starch to gel and form a bond between each of the first and second sheets of paper and the core. In this embodiment, the temperature range between about 160° F. and about 212° F. experienced during kiln drying causes the high amylose starch to gel, migrate toward the paper-core interface, and form a bond between each of the first and second sheets of paper and the core. In this embodiment, the high amylose starch can be modified to gel at or below approximately 212° F. or between 160° F. and 212° F. It is also preferred that the slurry is formed with a water-to-stucco ratio that is less than 0.80 and a high amylose start that has an amylose fraction greater than about 25%.

DETAILED DESCRIPTION OF THE INVENTION

A preferred method for manufacturing the core slurry composition and wallboard of the subject invention includes premixing dry and wet ingredients in a mixing apparatus, such as a pin mixer. The dry ingredients can include any combination of calcium sulfate hemihydrate (stucco), fiberglass and accelerator, as described below in greater detail. The dry ingredients may also include a starch.

The wet, aqueous solution can be made of many components, including but not limited to, a mixture of water, paper pulp, and potash (hereinafter, referred to as a "pulp paper solution"). The required starch can also be added to this pulp paper solution instead of the dry mixture as stated above, or alternatively, the required amount of starch may be added partly as a solid with the dry ingredients and the remainder added as a component of the pulp paper solution. The pulp paper solution provides a significant portion of the water that forms the gypsum slurry of the core composition.

The dry ingredients and the pulp paper solution contain the basic chemical components of a piece of wallboard and conventional methods of preparing such wallboards are well known to those skilled in the art. For example, the dry ingredients and pulp paper solution can be mixed together in a continuous mixer. In this manner, the dry ingredients and pulp paper solution create a fluid mixture or "slurry." The slurry is discharged from the mixer through a chute or "boot" which spreads the slurry on a moving, continuous bottom sheet of paper. A moving, continuous top sheet of paper is placed on the slurry and the bottom paper sheet so that the slurry is positioned in between the top and bottom sheets of paper to form the board. The board passes through a forming station which forms the wallboard to the desired thickness and width. The board then travels along a belt line for several minutes, during which time the rehydration reaction occurs and the board stiffens. The boards are then cut into a desired length and then fed into a large, continuous kiln for drying. During kiln travel, the excess water is evaporated from the gypsum core while the chemically bound water is retained in the newly formed gypsum crystals. As the starch gels, it is carried toward the paper-core interface by the evaporating water (i.e., migrates).

The stucco slurry can contain one of two forms of calcium sulfate hemihydrate (stucco): the α-hemihydrate form and the β-hemihydrate form. These two types of stucco are often produced by different means of calcinations. While the β-hemihydrate form is normally used due to its lower cost, either type of calcium sulfate hemihydrate is suitable for use with the different embodiments of the subject invention. The water-to-stucco ratio (i.e., weight of water divided by weight of stucco) is typically between 0.70-0.90. At higher water-to-stucco ratios, more energy and time is required to dry the excess water from the wallboard, but at lower ratios, the slurry loses its fluidity. While any water-to-stucco ratio can be used, it is an object of the subject invention to reduce the water-to-stucco ratio below 0.80 to decrease the cost in manufacturing the wallboard.

As eluded to above, the stucco slurry comprises a starch. Typically, an acid modified starch is utilized in the production of gypsum wallboard by adding the starch to the pulp paper solution, the dry stucco mixture or to both the pulp paper solution and dry stucco. Such acid-modified starches gel during the drying of the wallboard in a kiln and migrate to the paper-core interface with the evaporating water to form a bond between the gypsum core and the top and bottom sheets of paper (a "paper-core bond") that the core is sandwiched between. While such acid-modified starches add strength to the board and enhance a paper-core bond, it has been determined that the strength of the wallboard and of the paper-core bond can be further increased by replacing the typically used starches with a modified high amylose starch having an amylose fraction greater than 25%.

Unmodified (native) high amylose starches do not typically gel until they reach temperatures in excess of 238° F. Such unmodified high amylose starches would not gel in the wallboard process because gypsum core temperature does not exceed 212° F. during kiln travel. In contrast, modified high amylose starches with an amylose fraction of greater than 25% can be used in the standard wallboard manufacturing process because suitably modified high amylose starches will gel and achieve full functionality during the drying of the wallboard in the kiln. In one embodiment, modified high amylose starches that gel at or below a temperature of 212° F. are added to the slurry. In another embodiment, modified high amylose starches that gel at temperatures ranging between about 160° F. and about 212° F. are added to the slurry. Examples of high amylose starches that can be used, include, but are not limited to, Ultraset LT starch, Hylon V, and Hylon VII all available from National Starch Company. Such high amylose starches can be added either to the pulp paper solution, to the dry composition, or in part to both the pulp paper solution and the dry composition. Wallboards made with such modified high amylose starches have exhibited increased compressive strength and improved paper-core bond strength in wallboards when compared to boards made with traditional starches.

The core density and the overall weight of the wallboard can be controlled by incorporating aqueous foam into the stucco slurry. The foam usually is prepared using foam water, a foaming solution (i.e., soap), and air in any number of mechanical foam generation devices. It will be appreciated by one skilled in the art that as the weight of water is reduced in the stucco slurry, the volume of aqueous foam added to the slurry is increased to maintain the board weight. Other dry ingredients can also be added to the slurry. For example, an accelerator can be added to control the crystal nucleation and growth rate as the hydration reaction proceeds to form calcium sulfate dehydrate (gypsum). Retarders can also be added to adjust the setting time to allow the slurry to exit the mixer before it begins to set.

The following examples are included to demonstrate some of the possible embodiments of the invention. It should be appreciated by those of ordinary skill in the art that the techniques disclosed in the examples which follow represent techniques discovered by the inventors to function well in the practice of the invention, and thus, can be considered to constitute preferred modes for its practice. However, those of ordinary skill in the art should, in light of the present disclosure, appreciate that many changes can be made in the specific embodiments which are disclosed and still obtain a like or similar result without departing from the spirit and scope of the invention.

Sample Slurry Formulations

The humidified paper-core bond integrity and compressive (nail-pull) strength of a series of wallboard samples were compared to demonstrate the improvements in the strength of wallboards that contain high amylose starch. The humidified paper-core bond integrity is a measure of the percent of the cover paper able to be peeled away from the core after being subjected to a high humidity environment (i.e., an environment with 90% humidity and a 90° F. temperature) for a two hour period of time. The first board samples were prepared using slurries containing the normal amount of water (i.e., enough water for the water-to-stucco ratio to fall within the normal range of 0.81 to 0.90). The sample series only differed in that two of the samples contained an acid-modified corn starch and two samples contained a modified high amylose starch. Table I shows the component formulation in relative mass percentages of each of the four samples tested. It is understood by one skilled in the art that enough of each component is added to produce dry boards with weights around 1400 and 1650 pounds per 1,000 square feet.

TABLE I

| Normal Water-to-Stucco Formulation by Mass Percent | | | | |
|---|---|---|---|---|
| Stucco | 52.99% | 52.99% | 52.99% | 52.99% |
| Accelerator | 0.15% | 0.15% | 0.15% | 0.15% |
| Acid Thinned Starch | .26%-.71% | .26%-.71% | 0 | 0 |
| Modified High Amylose | 0 | 0 | .26%-.71% | .26%-.71% |
| Potash | 0.02% | 0.02% | 0.02% | 0.02% |
| Pulp Paper | .09% | .09% | .09% | .09% |
| Pulp Water | 26.59% | 26.59% | 26.59% | 26.59% |
| Dispersant | 0.06% | 0.06% | 0.06% | 0.06% |
| 10% Retarder | 0.02% | 0.02% | 0.02% | 0.02% |
| Foam Solution (×2) | 0.61% | 0.61% | 0.61% | 0.61% |
| Foam Water (×2) | 19.22% | 19.22% | 19.22% | 19.22% |

In addition to the stucco, starch, pulp paper, pulp water and potash being added to the stucco slurry composition, the slurry composition contains an accelerator, such as BMA (produced by National Gypsum Company), a retarder, such as, Proteinaceious Retarder (produced by the National Gypsum Company), Accumer (produced by Rohm & Haas), and RA-77 (produced by Rhodia), and a dispersant, such as Diloflow (produced by Geo Chemicals), Gypflow (produced by Ande) and Daxad (produced by Dow/Hampshire).

Based on the above stucco slurry formation between 0.26% and 0.71% of the slurry mass formulation for these boards is accounted for by starch. Two sets of board specimens were prepared with 0.71%, 0.55%, 0.42%, 0.34%, and 0.26% of starch by formula mass. Each of these boards were tested to measure the nail pull strength of the board and the strength of the paper-core bond. Table II shows the amount of paper core bond failure for each of these samples and Table III shows the nail pull strength of these samples with no water reduction in the stucco slurry composition.

TABLE II

| Percent 2-Hour Humidified Paper-Core Bond Failure | | | |
|---|---|---|---|
| Starch, Mass % | Acid-Thinned Normal % Peel Formulation | Starch, Mass % | High Amylose % Peel |
| .71% | 10 | .71% | 0 |
| .71% | 5 | .71% | 0 |
| .55% | 30 | .55% | 10 |
| .55% | 40 | .55% | 0 |
| .42% | 75 | .42% | 0 |
| .42% | 90 | .42% | 0 |
| .34% | 50 | .34% | 15 |
| .34% | 70 | .34% | 20 |
| .26% | 90 | .26% | 40 |
| .26% | 95 | .26% | 20 |

TABLE III

| Mean Avg. Nail Pulls | | | | | | |
|---|---|---|---|---|---|---|
| Starch, Mass % | Acid-Thinned Nail Pull | Mean Avg. Nail Pull | 0% Water Reduction | Starch, Mass % | High Amylose Nail Pull | Mean Avg. Nail Pull |
| .71% | 71.1 | 70.0 | | .71% | 72.2 | 73.3 |
| .71% | 68.9 | | | .71% | 74.4 | |
| .55% | 66.2 | 69.1 | | .55% | 76.1 | 74.4 |
| .55% | 71.9 | | | .55% | 72.6 | |
| .42% | 64.2 | 66.2 | | .42% | 74.4 | 73.5 |
| .42% | 68.1 | | | .42% | 72.5 | |
| .34% | 71.3 | 68.2 | | .34% | 76.0 | 75.0 |
| .34% | 65.0 | | | .34% | 73.9 | |
| .26% | 64.9 | 65.8 | | .26% | 71.4 | 71.3 |
| .26% | 66.6 | | | .26% | 71.2 | |

These tables reveal that before any water reduction takes place, the percent of paper-core bond failure is substantially reduced for wallboards that contain the modified high amylose starch as compared to wallboards containing the acid-thinned corn starch. Similarly, the compressive strength of the high amylose starch wallboards is slightly improved as demonstrated by the across the board increase in nail pull measurements for the high amylose starch wallboards as compared to the acid-thinned corn starch wallboards.

The increase in paper-core bond strength and in overall compressive strength can also be seen for wallboard samples that are made from stucco slurry compositions that contain 6% less water than a typical slurry composition, as showed in Table I. Table IV shows the composition of the stucco slurry used to create the samples with approximately 6% total water reduction from the first samples created for Tables I-III.

TABLE IV

| 6% Water-Reduction Formulation | | | | |
|---|---|---|---|---|
| Stucco | 53.94% | 53.94% | 53.94% | 53.94% |
| Accelerator | 0.15% | 0.15% | 0.15% | 0.15% |
| Acid Thinned Starch | .26%-.74% | .26%-.74% | 0 | 0 |
| Modified High Amylose | 0 | 0 | .26%-.74% | .26%-.74% |
| Potash | .02% | .02% | .02% | .02% |
| Pulp Paper | .09% | .09% | .09% | .09% |
| Pulp Water | 24.64% | 24.64% | 24.64% | 24.64% |
| Dispersant | .21% | .21% | .21% | .21% |
| 10% Retarder | .02% | .02% | .02% | .02% |
| Foam Solution (×2) | .62% | .62% | .62% | .62% |
| Foam Water (×2) | 19.57% | 19.57% | 19.57% | 19.57% |

As shown in Table IV, the stucco slurry composition for this embodiment is the same as Table I except the water-to-stucco ratio for each sample has been reduced by an approximate 6%. Formulations containing, between 0.26% and 0.74% by mass of each type of starch were studied. Two sets of board specimens were prepared with 0.74%, 0.56%, 0.43%, 0.35%, and 0.26% of starch by formula mass. The first set with acid-thinned and the second with modified high amylose starch. Table V shows the amount of paper core failure for each of the samples and Table VI shows the nail pull strength of these samples with approximately 6% water-to-stucco reduction in the stucco slurry composition.

TABLE V

| Percent 2-Hour Humidified Paper-Core Bond Failure | | | |
|---|---|---|---|
| Starch, Mass % | Acid-Thinned % Peel | 6% Water Reduction Starch, Mass % | High Amylose % Peel |
| .74% | 2 | .74% | 0 |
| .74% | 5 | .74% | 0 |
| .74% | 5 | .74% | 0 |
| .74% | 5 | .74% | 0 |
| .56% | 0 | .56% | 0 |
| .56% | 8 | .56% | 0 |
| .56% | 2 | .56% | 0 |
| .56% | 0 | .56% | 0 |
| .43% | 3 | .43% | 8 |
| .43% | 6 | .43% | 10 |
| .43% | 10 | .43% | 0 |
| .43% | 15 | .43% | 0 |
| .35% | 10 | .35% | 10 |
| .35% | 8 | .35% | 5 |
| .35% | 10 | .35% | 10 |
| .35% | 50 | .35% | 10 |
| .26% | 10 | .26% | 0 |
| .26% | 15 | .26% | 15 |
| .26% | 30 | .26% | 8 |
| .26% | 40 | .26% | 5 |

TABLE VI

| Mean Average Nail Pulls | | | | | | |
|---|---|---|---|---|---|---|
| Starch Mass % | Acid-Thinned Nail Pull | Mean Avg. Nail Pull | 6% Water Reduction | Starch Mass % | High Amylose Nail Pull | Mean Avg. Nail Pull |
| .74% | 73.5 | 71.2 | | .74% | 76.8 | 73.0 |
| .74% | 70.79 | | | .74% | 69.8 | |
| .74% | 70.1 | | | .74% | 72.7 | |
| .74% | 70.4 | | | .74% | 72.8 | |
| .56% | 70.7 | 72.0 | | .56% | 74.4 | 74.0 |
| .56% | 74.4 | | | .56% | 73.7 | |
| .56% | 70.2 | | | .56% | 74.2 | |
| .56% | 72.5 | | | .56% | 73.7 | |
| .43% | 68.6 | 67.9 | | .43% | 71.3 | 69.6 |
| .43% | 66 | | | .43% | 68.9 | |
| .43% | 68.9 | | | .43% | 69.4 | |
| .43% | 68.1 | | | .43% | 68.7 | |
| .35% | 66.2 | 71.4 | | .35% | 70.8 | 70.7 |
| .35% | 71.1 | | | .35% | 70.5 | |
| .35% | 77.7 | | | .35% | 70.8 | |
| .35% | 70.7 | | | .35% | 70.7 | |
| .26% | 67.9 | 70.5 | | .26% | 69.3 | 68.5 |
| .26% | 69.0 | | | .26% | 65.9 | |
| .26% | 74.2 | | | .26% | 69.2 | |
| .26% | 70.9 | | | .26% | 69.5 | |

Table V demonstrates that there is a slight increase in the humidified paper-core bond integrity as evident by the on average decrease in the percentage of humidified paper-core failure. Table VI demonstrates that there is a decrease in nail-pull measurements correlating with the reduction in starch usage, however, no appreciable differences between high-amylose and acid-thinned starch is evidenced in the compressive strength of the wallboard, as evident from the mean average nail pull measurements of the acid-thinned and high amylose starch wallboard samples. With this particular formulation, it has been found that the impact on compressive strength of the wallboard is variable and falls within the standard deviation of nail-pull strength normally observed. However, as demonstrated below, the effect on the compressive and paper-core bond is most substantially increased as the water levels are reduced further in the slurry composition.

Table VII shows the formulation of the samples of wallboard with an approximate 13% water-to-stucco reduction in the stucco slurry composition as compared to the stucco slurry composition of Table I.

TABLE VII

| 13% Water-Reduction Formulation by Mass Percent | | | | |
|---|---|---|---|---|
| Stucco | 55.29% | 55.29% | 55.29% | 55.29% |
| Accelerator | .15% | .15% | .15% | .15% |
| Acid Thinned Starch | .27%–.75% | .27%–.75% | 0 | 0 |
| Modified High Amylose | 0 | 0 | .27%–.75% | .27%–.75% |
| Potash | .02% | .02% | .02% | .02% |
| Pulp Paper | .10% | .10% | .10% | .10% |
| Pulp Water | 19.92% | 19.92% | 19.92% | 19.92% |
| Dispersant | .52% | .52% | .52% | .52% |
| 10% Retarder | .03% | .03% | .03% | .03% |
| Foam Solution (×2) | .76% | .76% | .76% | .76% |
| Foam Water (×2) | 22.46% | 22.46% | 22.46% | 22.46% |

Formulations containing, between 0.27% and 0.75% by mass of either type of starch were studied. Two sets of board specimens were prepared with 0.74%, 0.56%, 0.43%, 0.35%, and 0.26% of starch by formula mass. The first set with acid-thinned and the second with modified high amylose starch.

Samples of wallboard made from the stucco slurry compositions of Table VII were tested to determine the humidified paper-core bond integrity of the wallboard and the nail-pull strength of the wallboard. Table VIII shows the amount of paper-core failure for each of the samples and Table IX shows the nail pull strength of these samples with approximately 13% water-to-stucco reduction in the stucco slurry composition.

TABLE VIII

| Percent 2-Hour Humidified Paper-Core Bond Failure | | | |
|---|---|---|---|
| Starch, Mass % | Acid-Thinned % Peel | 13% Water Reduction Starch, Mass % | High Amylose % Peel |
| .75 | 10 | .75 | 0 |
| .75 | 10 | .75 | 0 |
| .75 | 30 | .75 | 0 |
| .75 | 20 | .75 | 0 |
| .58 | 40 | .58 | 0 |
| .58 | 70 | .58 | 0 |
| .58 | 50 | .58 | 0 |
| .58 | 60 | .58 | 0 |
| .44 | 20 | .44 | 0 |
| .44 | 25 | .44 | 0 |
| .44 | 40 | .44 | 10 |
| .44 | 30 | .44 | 10 |
| .35 | 10 | .35 | 0 |
| .35 | 30 | .35 | 0 |
| .35 | 10 | .35 | 0 |
| .35 | 75 | .35 | 15 |
| .27 | 40 | .27 | 10 |
| .27 | 100 | .27 | 0 |
| .27 | 95 | .27 | 15 |
| .27 | 100 | .27 | 25 |

TABLE IX

| Mean Average Nail Pulls | | | | | | |
|---|---|---|---|---|---|---|
| Starch Mass % | Acid-Thinned Nail Pull | Mean Avg. Nail Pull | 13% Water Reduction | Starch Mass % | High Amylose Nail Pull | Mean Avg. Nail Pull |
| .75 | 75.4 | 73.6 | | .75 | 83.7 | 82.6 |
| .75 | 74.9 | | | .75 | 82.9 | |
| .75 | 72.7 | | | .75 | 82.1 | |
| .75 | 71.3 | | | .75 | 81.6 | |
| .58 | 67.6 | 69.0 | | .58 | 73.6 | 75.1 |
| .58 | 73.6 | | | .58 | 68.9 | |
| .58 | 67.4 | | | .58 | 79.9 | |
| .58 | 67.3 | | | .58 | 78.1 | |
| .44 | 69.2 | 69.0 | | .44 | 75.7 | 74.4 |
| .44 | 68.2 | | | .44 | 74.6 | |
| .44 | 70.7 | | | .44 | 69.8 | |
| .44 | 68.1 | | | .44 | 77.5 | |
| .35 | 72.5 | 71.5 | | .35 | 74.5 | 75.0 |
| .35 | 71.0 | | | .35 | 73.3 | |
| .35 | 72.9 | | | .35 | 75.9 | |
| .35 | 69.7 | | | .35 | 76.2 | |
| .27 | 67.2 | 64.4 | | .27 | 71.5 | 72.3 |
| .27 | 68.4 | | | .27 | 75.5 | |
| .27 | 65.3 | | | .27 | 71.2 | |
| .27 | 56.5 | | | .27 | 71.0 | |

These tables reveal that the percent of paper-core bond failure is substantially reduced for wallboard samples made with approximately 13% water reduction and that contain the high amylose starch instead of the acid-thinned corn starch. Similarly, the overall strength of the high amylose starch wallboards is markedly improved as demonstrated by the across the board increase in nail pull measurements for the high amylose starch wallboards with approximately 13% water reduction as compared to the acid-thinned corn starch wallboards.

While the subject invention has been described in detail with reference to certain exemplary embodiments thereof, such are offered by way of non-limiting example of the invention, as other versions are possible. It is anticipated that a variety of other modifications and changes will be apparent to those having ordinary skill in the art and that such modifications and changes are intended to be encompassed within the spirit and scope of the invention as defined by the following claims.

We claim:

1. A wallboard slurry composition comprising:
    (a) calcium sulfate hemihydrate;
    (b) water, wherein the water to calcium sulfate hemihydrate ratio is less than about .80; and
    (c) a high amylose starch having an amylose fraction greater than about 25% and that gels at a temperature of about 160° F. to about 212° F., wherein the said high amylose starch comprises about 0.26 mass % to about 0.71 mass % of the wallboard slurry composition.

2. The wallboard slurry composition of claim 1 wherein the high amylose starch comprises a high amylose starch that gels at a temperature of about 180° F.

3. A wallboard slurry composition comprising:
    (a) calcium sulfate hemihydrate;
    (b) water, wherein the water to calcium sulfate hemihydrate ratio is less than about .80; and
    (c) a high amylose starch having an amylose fraction greater than about 25% and that gels at a temperature of about or below 212° F., wherein the said high amylose starch comprises about 0.26 mass % to about 0.71 mass % of the slurry.

4. A method of preparing wallboard, the method comprising the steps of:
    forming a slurry comprising water and calcium sulfate hemihydrate, wherein the water to calcium sulfate hemihydrate ratio is less than about .80 and wherein the slurry further comprises a high amylose starch having an amylose fraction greater than about 25% and that gels at a temperature of about 160° F. to about 212° F., wherein the said high amylose starch comprises about 0.26 mass % to about 0.71 mass % of the slurry;
    depositing the slurry on a first sheet of paper;
    applying a second sheet of paper on the slurry to form a wet wallboard;
    allowing the slurry to set and form a core between the first and second sheets of paper; and
    causing the high amylose starch to gel and form a bond between each of the first and second sheets of paper and the core.

5. The method of preparing wallboard of claim 4 wherein the step of causing the high amylose starch to gel comprises the step of drying the wallboard at a temperature at about 180°F.

6. The method of preparing wallboard of claim 4 further comprising the steps of:
    providing a combination of calcium sulfate hemihydrate and at least one other dry ingredient;
    providing a paper pulp solution comprising a mixture of at least water and at least one other component; and
    wherein the step of forming the slurry further comprises mixing together said combination of calcium sulfate hemihydrate and at least one other dry ingredient with said paper pulp solution.

7. The method of preparing wallboard of claim 6 wherein the at least one other dry ingredient comprises at least the high amylose starch having an amylose fraction greater than about 25%.

8. The method of preparing wallboard of claim 6 wherein the at least one other component comprises at least the high amylose starch having an amylose fraction greater than about 25%.

9. The method of preparing wallboard of claim 6 wherein the at least one other dry ingredient and the at least one other component both comprise at least a portion of the high amylose starch having an amylose fraction greater than about 25%.

10. The method of preparing wallboard of claim 6 wherein the step of forming the slurry further comprises adding the high amylose starch having an amylose fraction greater than about 25% to the mixture of said combination of calcium sulfate hemihydrate and at least one other dry ingredient with said paper pulp solution.

* * * * *